United States Patent
Hansen et al.

(10) Patent No.: US 8,942,918 B2
(45) Date of Patent: Jan. 27, 2015

(54) MULTIPLE ROUTE PRE-CALCULATION AND PRESENTATION FOR A VEHICLE NAVIGATION SYSTEM

(75) Inventors: Cody R. Hansen, Shelby Township, MI (US); Andrew W. Gellatly, Macomb, MI (US); John P. Weiss, Shelby Township, MI (US); Matthew M. Highstrom, South Lyon, MI (US); Bhavna Mathur, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1301 days.

(21) Appl. No.: 12/487,852

(22) Filed: Jun. 19, 2009

(65) Prior Publication Data
US 2010/0324817 A1    Dec. 23, 2010

(51) Int. Cl.
G01C 21/36    (2006.01)
G01C 21/34    (2006.01)

(52) U.S. Cl.
CPC .................................... G01C 21/3415 (2013.01)
USPC ........... 701/419; 701/410; 701/411; 701/428; 701/431

(58) Field of Classification Search
CPC .......... G01C 21/3415; G01C 21/3492; G08G 1/096827; G08G 1/096844; G08G 1/096861; G08G 1/09685; G08G 1/096838; G01G 1/096872
USPC ......... 701/410, 411, 412, 425, 428, 430, 431, 701/437, 533, 418, 419, 532
See application file for complete search history.

(56) References Cited

U.S. PATENT DOCUMENTS

| | | | | |
|---|---|---|---|---|
| 5,220,507 A | * | 6/1993 | Kirson | 701/533 |
| 5,508,930 A | * | 4/1996 | Smith, Jr. | 701/416 |
| 5,659,476 A | * | 8/1997 | LeFebvre et al. | 701/417 |
| 5,699,056 A | * | 12/1997 | Yoshida | 340/905 |
| 5,742,922 A | * | 4/1998 | Kim | 701/423 |
| 5,774,827 A | * | 6/1998 | Smith et al. | 701/431 |
| 6,163,751 A | * | 12/2000 | Van Roekel | 701/414 |

(Continued)

FOREIGN PATENT DOCUMENTS

| | | |
|---|---|---|
| DE | 19616071 A1 | 10/1997 |
| DE | 19748077 A1 | 5/1998 |
| DE | 10131432 A1 | 1/2003 |
| DE | 10331155 A1 | 1/2005 |

(Continued)

OTHER PUBLICATIONS

German Office Action, dated Aug. 31, 2011, for German Patent Application No. 10 2010 023 942.9.

*Primary Examiner* — Stephen Holwerda
(74) *Attorney, Agent, or Firm* — Ingrassia Fisher & Lorena, P.C.

(57) ABSTRACT

A navigation system and related operating methods are provided for instructing an operator of a vehicle. The navigation system obtains a destination location and generates a proposed route to the destination location. The proposed route is defined by one or more driver decision points and associated driving maneuvers. Before the vehicle reaches an approaching driver decision point, the navigation system pre-calculates alternate routes between the approaching driver decision point and the destination location, and saves the alternate routes for subsequent activation. Pre-calculated alternate routes can also be used to determine and indicate the relative importance of an approaching driving maneuver. The driver can consider the importance of driving maneuvers when deciding whether or not to follow the recommended route.

20 Claims, 4 Drawing Sheets

(56) References Cited

U.S. PATENT DOCUMENTS

| | | | |
|---|---|---|---|
| 6,256,577 B1 * | 7/2001 | Graunke | 701/117 |
| 6,546,337 B2 * | 4/2003 | Fish et al. | 701/454 |
| 6,701,250 B1 * | 3/2004 | Rychlak | 701/414 |
| 2002/0052689 A1 * | 5/2002 | Yamashita et al. | 701/211 |
| 2010/0094540 A1 | 4/2010 | Tava et al. | |
| 2010/0138146 A1 | 6/2010 | Vogt et al. | |

FOREIGN PATENT DOCUMENTS

| | | |
|---|---|---|
| DE | 102005021271 B3 | 12/2006 |
| DE | 102006057427 A1 | 6/2008 |
| DE | 102007017174 A1 | 10/2008 |
| EP | 0803852 A1 | 10/1997 |
| EP | 1271104 A2 | 1/2003 |
| EP | 1722196 A1 | 11/2006 |
| WO | 2005005928 A1 | 1/2005 |

* cited by examiner

Fig. 5

MULTIPLE ROUTE PRE-CALCULATION AND PRESENTATION FOR A VEHICLE NAVIGATION SYSTEM

TECHNICAL FIELD

Embodiments of the subject matter described herein relate generally to vehicle navigation and route planning systems. More particularly, embodiments of the subject matter relate to a vehicle navigation system that pre-calculates alternate routes to a destination before the vehicle diverts from the currently calculated route.

BACKGROUND

The prior art is replete with different types of electronic navigation systems. Some electronic navigation systems are handheld, and others are vehicle-based. A vehicle navigation system generally provides navigation instructions, location data, and map information to the vehicle operator. Some existing vehicle navigation systems attempt to optimize a route based upon different factors. Route calculation is typically performed by examining a number of possible paths, and selecting the "best" path according to a number of optimization rules. For instance, the shortest possible route may be chosen to minimize the distance traveled or high-speed roads may be chosen to minimize travel time. Some advanced navigation systems utilize real-time traffic congestion data in an attempt to guide the vehicle away from traffic jams. After the optimization criteria have been selected, automated vehicle route guidance is typically performed in a two-step process: (1) a proposed route is calculated from a starting position of the vehicle to the desired destination; and (2) guidance instructions are presented to the vehicle operator as the vehicle traverses the proposed route.

Many existing vehicle navigation systems will automatically calculate an updated route whenever the vehicle diverts from the previously calculated route. For example, after the system detects that the vehicle has turned at an intersection rather than proceed straight as originally designated, it will generate a new route to the destination, based upon the current location of the vehicle. Recalculation of an alternate route can take an appreciable amount of time (associated with the determination that the vehicle did not follow the original route, and with the actual computation of the new route), which can be inconvenient and confusing for the driver.

Existing vehicle navigation systems annunciate and/or display guidance instructions to the driver in advance of the next approaching intersection, transition, turnoff, or driving maneuver. For example, a system might display and audibly announce "Exit At Maynard Avenue" one or more times as the vehicle approaches that turnoff. However, the instruction "Exit At Maynard Avenue" in and of itself does not convey whether or not the driver "MAY exit," or "SHOULD exit," or "MUST exit" at Maynard Avenue. In this context, if Maynard Avenue is the last freeway exit for twenty miles, then the instruction ought to be treated as mandatory, important, or critical. On the other hand, if the driver can easily backtrack to Maynard Avenue by taking the immediately following freeway exit, then the instruction need not be treated as mandatory, important, or critical. Existing vehicle navigation systems do not alter or modulate the manner in which driving instructions are presented as a function of the importance of the driving maneuvers.

BRIEF SUMMARY

A navigation method is provided for instructing an operator of a vehicle. The method obtains a destination location, and generates a proposed route to the destination location. The proposed route is defined by one or more driver decision points and associated driving maneuvers. Before the vehicle reaches an approaching driver decision point, the method pre-calculates an alternate route between the approaching driver decision point and the destination location. Next, the method saves the alternate route to obtain a saved alternate route for subsequent activation.

Another navigation method for instructing an operator of a vehicle is also provided. This method begins by generating a proposed route to a destination location. The method pre-calculates, before the vehicle reaches an approaching driver decision point of the proposed route, an alternate route between the approaching driver decision point and the destination location, wherein the alternate route is different than the proposed route. The proposed route is compared to the alternate route to obtain a route comparison, and the method continues by determining a difference metric value associated with the route comparison. Then, the method presents, to the operator of the vehicle, indicia of the importance of a driving maneuver associated with the approaching driver decision point. The driving maneuver is recommended by the proposed route, and content of the indicia is influenced by the difference metric.

A navigation system is provided for instructing an operator of a vehicle. The system includes a navigation processor and a display element. The navigation processor is configured to obtain a destination location, and to generate a proposed route to the destination location. The proposed route is defined by one or more driver decision points and associated driving maneuvers. The display element is coupled to the navigation processor, and the display element is configured to render a graphical representation of at least one segment of the proposed route. Before the vehicle reaches an approaching driver decision point, the navigation processor pre-calculates an alternate route between the approaching driver decision point and the destination location. The navigation processor activates the alternate route when the vehicle diverts from the proposed route at the approaching driver decision point.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to signal processing, image processing, data transmission, general vehicle navigation system operation, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

When using a vehicle navigation system, drivers will sometimes deviate from a proposed route because they are aware of an alternate path, they do not like the proposed route, they want to take a side trip, or for some other reason. Traditionally, when a driver deviates from a predetermined route calculated by a navigation system, the system will announce that it is recalculating the route in an attempt to direct the driver back to the original route. Drivers tend to disable voice prompts of a vehicle navigation system to avoid being annoyed by recalculation prompts and related guidance instructions.

An embodiment of an electronic navigation system as described here can reduce or eliminate the bothersome experience associated with the recalculation of a proposed route, while still providing valuable driving instructions that lead to the desired destination. The system allows the driver to feel more in control by giving the driver alternatives at route nodes when appropriate, and by indicating to the driver when a given route segment really should be followed. Certain embodiments of the navigation system will calculate alternate routes corresponding to each node or driver decision point along an originally planned route. Thus, when the driver misses a planned maneuver or chooses to take an alternate path, the system can automatically and quickly switch to the appropriate pre-calculated alternate route without delay. This methodology provides useful alternate route information to the driver in a seamless manner and without forcing the driver back to the originally planned route. The system may also show the primary route and one or more alternative routes, along with acceptable paths of travel at each driver decision point, to give options to the driver rather than providing only one proposed route.

In certain embodiments, the navigation system need not calculate all possible routes from a given driver decision point. Rather, the system could selectively calculate and store alternate routes that are realistic and practical. For example, the system might selectively process alternate routes that do not add a significant or unreasonable amount of driving time or mileage to the originally planned route. As another example, the system need not compute alternate routes that would generally lead the vehicle away from the intended destination.

The vehicle navigation system could also calculate and process alternate routes in advance to determine the relative importance or criticality of approaching maneuvers. In turn, the system can indicate to the driver whether or not certain maneuvers are optional, highly recommended, mandatory, etc. In certain embodiments, when a given route instruction is calculated, one or more secondary routes are computed and analyzed to determine what might happen if the driver misses the recommended route instruction. If a secondary route will significantly or noticeably impact the desired route (e.g., it adds fifteen miles to the commute), then the system will notify the driver of the relative importance of the approaching maneuver. Such additional guidance will help the driver decide whether to focus on or casually follow a given driving instruction.

The indication of relative importance can be conveyed to the driver in a variety of ways, including, without limitation: color coding; voice prompt authoritativeness; voice prompt timing; a time difference; a mileage difference; or the like. For example, if the vehicle is traveling on a highway and is supposed to exit before a bridge, then the system could inform the driver well in advance that the highway must be exited before the bridge, otherwise at least twenty minutes will be added to the drive time.

Figure 1:
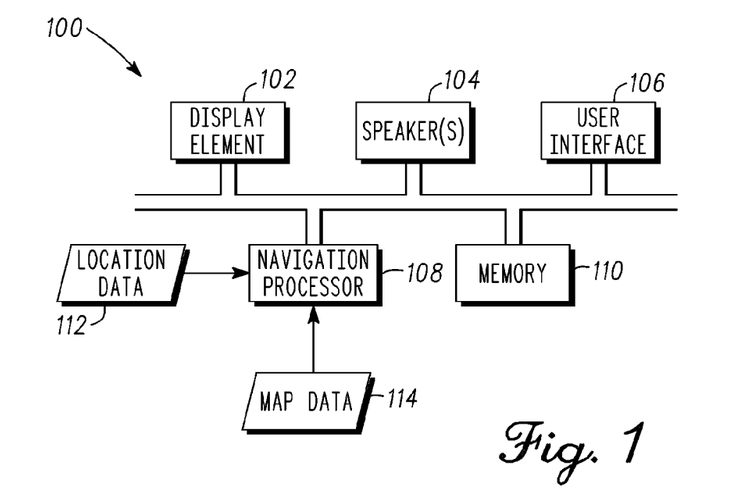
FIG. 1 is a schematic representation of an embodiment of a vehicle navigation system.

Turning now to the figures, FIG. 1 is a schematic representation of an embodiment of a navigation system 100, which is suitably configured to instruct an operator. For this example, the system 100 is deployed onboard a host vehicle, such as an automobile. In practice, the system 100 may be implemented as part of an onboard vehicle navigation system, an onboard vehicle entertainment system, an onboard display system, an onboard vehicle instrumentation cluster, or the like. In other embodiments, the system 100 may be implemented as a portable system or incorporated into a mobile device such as a mobile telephone, a personal digital assistant, a video game device, or the like. The illustrated embodiment of the system 100 includes, without limitation: a display element 102; at least one speaker 104; a user interface 106; a navigation processor 108; and a suitable amount of memory 110. In practice, the various components of the system 100 are coupled together in a manner that facilitates the communication of data, instructions, control signals, and possibly other signals. In practice, the system 100 may include additional components configured to perform conventional functions that are unrelated to the subject matter described here.

Generally, the navigation processor 108 is configured to perform or otherwise support the various operations and functions described herein. The navigation processor 108 may include one processor device or a plurality of cooperating processor devices. Moreover, the navigation processor 108 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The memory 110 accommodates the saving and storing of data, software program code, and other information used to support the operation of the system 100. The memory 110 may be realized as RAM memory, flash memory, EPROM memory, EEPROM memory, registers, a hard disk, a removable disk, a CD-ROM, or any other form of storage medium known in the art. The memory 110 can be coupled to other elements of the system 100 to support the reading of information from, and the writing of information to, the memory 110. In certain embodiments, the memory 110 is integral to the navigation processor 108. For example, the navigation processor 108 and the memory 110 may reside in an ASIC or be implemented with a system on a chip.

For this embodiment of the system 100, the navigation processor 108 obtains location data 112 from an appropriate source that provides data indicative of the current vehicle location or position. In one practical embodiment, the location data source is realized as an onboard GPS receiver/processor that derives the current geographic position of the vehicle from GPS data received by the vehicle in real-time or substantially real-time.

The navigation processor 108 is also configured to obtain map data 114 from an appropriate source that provides data indicative of current cartographic, topological, location, road, and possibly other data useful to the system 100. The map data 114 can represent locally stored, cached, downloaded, or accessible information, which can be processed by the navigation processor 108. For example, in a fully onboard implementation, the map data source(s) may be realized as one or more hard disks, semiconductor memory devices, portable storage media, or the like. In an alternate embodiment, the map data source(s) may be realized as an onboard memory cache that temporarily stores the map data 114 that is downloaded from remote databases.

The display element 102, the speaker(s) 104, and the user interface 106 may be configured in accordance with conventional vehicle navigation, information, or instrumentation systems to enable onboard interaction with the vehicle operator. The display element 102 may be a suitably configured LCD, plasma, CRT, OLED, or head-up display, which may or may not be utilized for other vehicle functions. In accordance with known techniques, an appropriate display driver of the system 100 can provide rendering control signals to the display element 102 to cause the display element 102 to render maps, proposed routes, roads, navigation direction arrows, and other graphical representations, elements, or indicia as necessary to support the function of the system 100.

The speaker(s) 104 may be devoted to the system 100, may be realized as part of the audio system of the vehicle, or may be realized as part of another system or subsystem of the vehicle. Briefly, speaker(s) 104 may receive audio signals from the navigation processor 108, where such audio signals convey navigation instructions, user prompts, warning signals, and other audible signals as necessary to support the function of the system 100.

User interface 106 is configured to allow the vehicle operator to enter data and/or control the functions and features of the system 100. For example, the operator can manipulate the user interface 106 to enter a starting location and a destination location for the vehicle, where the starting and destination locations are utilized by the system 100 for purposes of route planning. If the desired starting location corresponds to the current vehicle location, then the operator need not enter the starting location if the system 100 includes a source of current vehicle position information. The user interface 106 may be realized using any conventional device or structure, including, without limitation: a keyboard or keypad; a touch screen (which may be incorporated into the display element 102); a voice recognition system; a cursor control device; a joystick or knob; or the like.

The system 100 can perform a number of navigation functions, operations, processes, and methods, which are described in more detail herein. Typically, the system 100 generates and presents guidance information and instructions associated with a proposed or default route to a destination. In addition, the system 100 generates at least one alternate or secondary route in advance such that the alternate route can be activated with little to no delay when needed.

Figure 2:
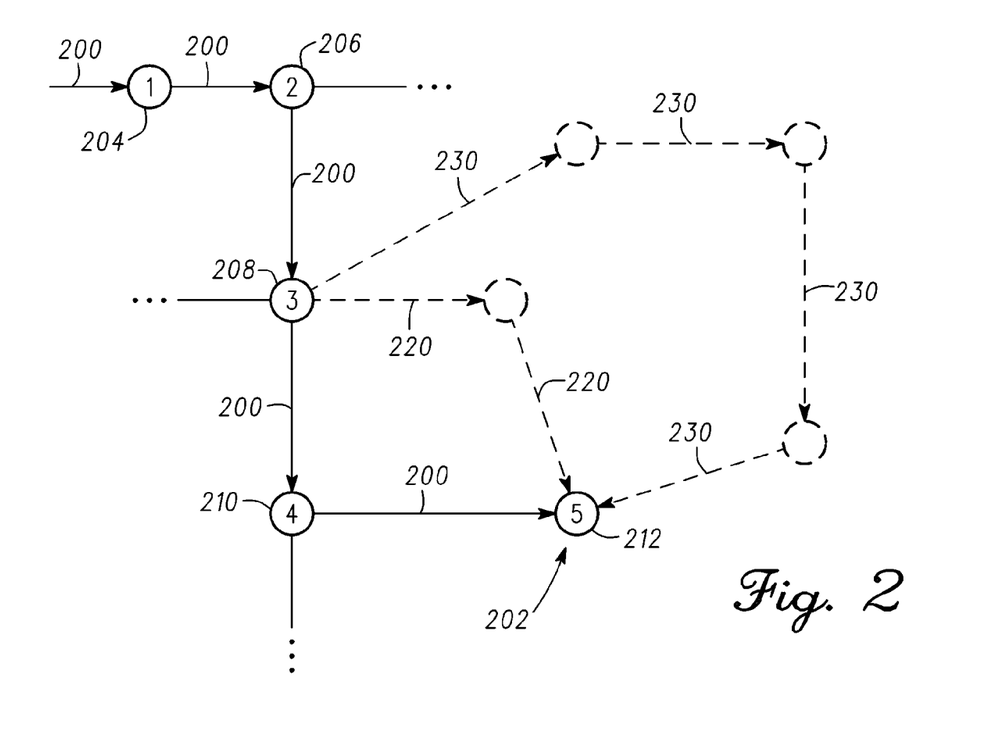
FIG. 2 is a diagram of a proposed driving route and alternate route segments.

FIG. 2 is a diagram of a proposed driving route 200 and alternate route segments that lead to a destination location 202. The proposed driving route 200 includes five segments, which are separated by nodes or driver decision points. In FIG. 2, the circles represent the different driver decision points. As used here, a "driver decision point" is any location, position, intersection, landmark, waypoint, street name, measure of distance, on-ramp/off-ramp, or the like, that might be used by the navigation system as a reference for providing route guidance. For example, a driver decision point may be associated with one of more of the following instructions, without limitation: turn left or right; veer left or right; stay left or right; proceed straight; make a U-turn; exit or enter a road, highway, or freeway; stop; arrive at destination; or the like.

The proposed driving route 200 is defined by five driver decision points (the numbered circles in FIG. 2). For this example, prior to the first driver decision point 204 the navigation system might announce (audibly and/or visually) an instruction to continue ahead or proceed straight on the current path. Alternatively, since no driving maneuver is required at the first driver decision point 204, the navigation system could remain silent at this point. The second driver decision point 206 corresponds to an instruction to turn right, the third driver decision point 208 is associated with an instruction to continue straight (or, in some embodiments, no instruction), the fourth driver decision point 210 corresponds to an instruction to turn left, and the fifth driver decision point 212 represents the destination location 202.

FIG. 2 also depicts two alternate routes that could be taken from the third driver decision point 208. Either of these two alternate routes could result if the vehicle diverts from the original proposed driving route 200. For this example, if the vehicle turns left at the third driver decision point 208, then a first alternate route 220 may be taken. If, however, the vehicle makes a sharp left turn at the third driver decision point 208, then a second alternate route 230 may be taken. As depicted in FIG. 2, the first alternate route 220 results in some additional time and mileage relative to the proposed driving route 200. On the other hand, the second alternate route 230 would result in a significant amount of additional time and mileage. Thus, the first alternate route 220 is preferred over the second alternate route 230. As explained in more detail herein, certain embodiments of a navigation system might provide information prior to the third driver decision point 208, such that the driver can decide how best to maneuver the vehicle at that point.

Figure 3:
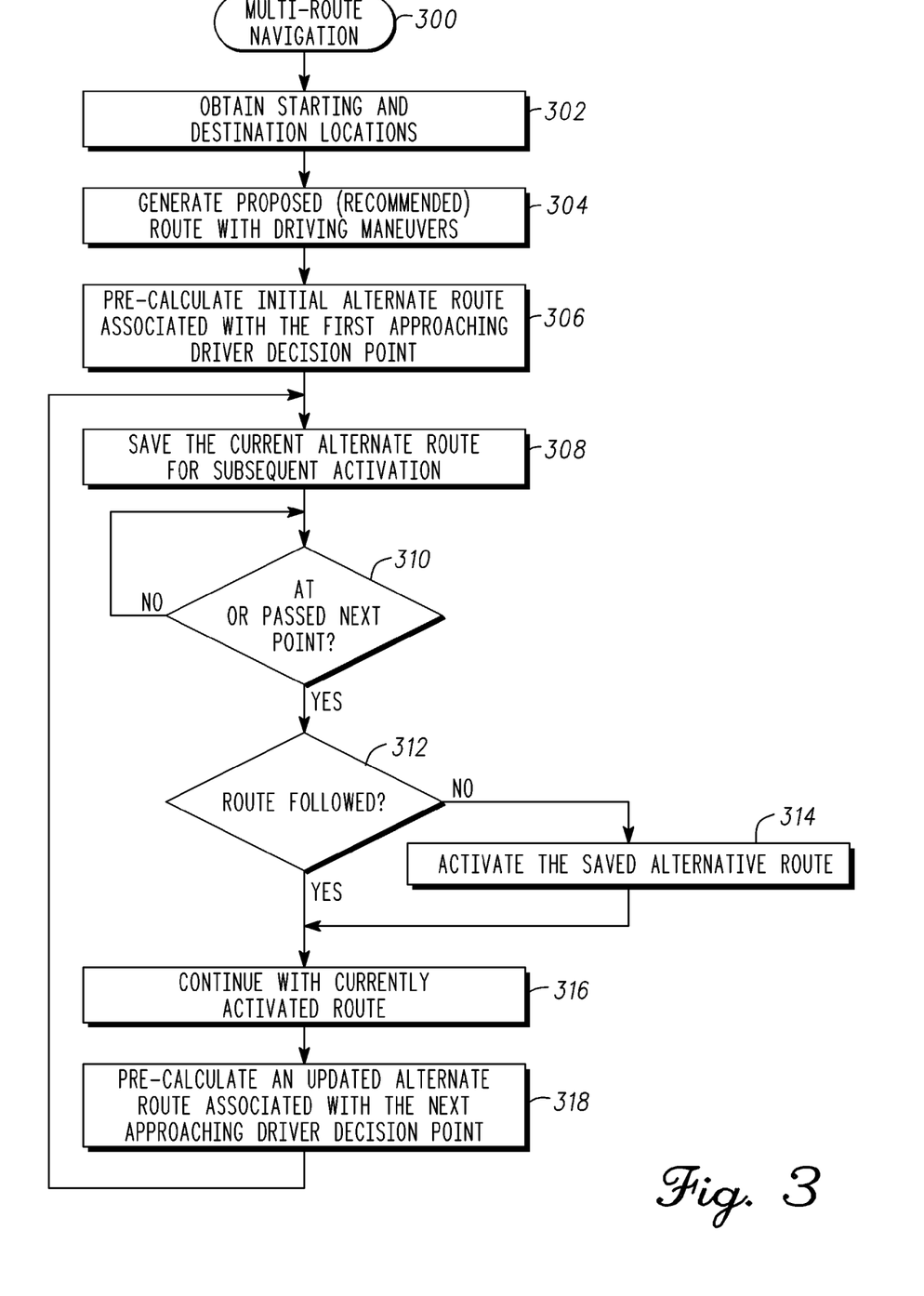
FIG. 3 is a flow chart that illustrates an embodiment of a multi-route navigation process.

FIG. 3 is a flow chart that illustrates an embodiment of a multi-route navigation process 300. The process 300 may be performed by, for example, the navigation system 100. The various tasks performed in connection with the process 300 may be performed by software, hardware, firmware, or any combination thereof. For illustrative purposes, the following description of the process 300 may refer to elements mentioned above in connection with FIG. 1. In practice, portions of the process 300 may be performed by different elements of the described system, e.g., the navigation processor, the memory element, the display element, or the like. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, in some embodiments, one or more of the illustrated tasks may be omitted.

The multi-route navigation process 300 represents one exemplary technique for pre-calculating and storing one or more alternate routes to a destination location. Thus, the process 300 may begin by obtaining a starting location and a destination location for the vehicle (task 302). The starting and destination locations may be utilized to determine one or more potential routes or potential route sections to be recommended for travel to the destination location. Next, the process 300 generates a proposed route to the destination location (task 304). As explained above with reference to FIG. 2, the proposed route generated during the task 304 can be defined by one or more driver decision points, along with their associated driving maneuvers. This proposed route can be saved for use as the default route. In some embodiments, the process 300 may generate more than one proposed route for selection by the vehicle operator. The process 300 will provide navigation instructions corresponding to the currently active route to the vehicle operator in an ongoing manner, as is understood by those familiar with vehicle/portable navigation systems. The navigation instructions may be realized as graphical reminders, audible warnings or instructions, a printed map indicating the proposed route, or the like.

In contrast to conventional navigation systems that compute alternate routes only when necessary (i.e., after the vehicle has diverted from the currently active navigation route), a navigation system that executes the multi-route navigation process 300 pre-calculates at least one alternate route to the destination location (task 306). This pre-calculation occurs some time before the vehicle reaches an approaching driver decision point, e.g., the next driver decision point. The alternate route provides driving instructions and guidance between the approaching driver decision point and the destination location, and the alternate route is different than the corresponding portion of the proposed route. In certain embodiments, an alternate route for the next approaching driver decision point is pre-calculated when the vehicle is near, has passed, or has satisfied the driving maneuver for, the last driver decision point. In other embodiments, an alternate route for an approaching driver decision point can be pre-calculated at any time before the vehicle reaches that point, for example, two or more driver decision points ahead of time.

Pre-calculation of alternate routes considers one or more of the possible ways that the vehicle might divert from the currently active route at the approaching driver decision point. For instance, if the default route instructs the driver to veer left at a fork in the road, then the task 306 will pre-calculate one or more alternate routes that assume the vehicle instead veers right. As another example, if the default route instructs the driver to proceed straight at a four-way intersection, then the task 306 will pre-calculate at least one alternate route that assumes the vehicle turns right, at least one alternate route that assumes the vehicle turns left, and possibly at least one alternate route that assumes the vehicle makes a U-turn. In practice, the task 306 need not completely re-calculate the route to the destination location. Rather, the task 306 could merely re-calculate a path that brings the vehicle back to a driver decision point that is included in the original proposed route.

After pre-calculating one or more alternate routes, the multi-route navigation process 300 can save the alternate route(s) for subsequent activation (task 308). Thus, alternate routes can be stored for quick and virtually immediate activation if necessary. Such pre-calculation and saving of alternate routes enhances the user experience of the navigation system, and reduces or eliminates delay that is normally associated with on-the-fly dynamic route recalculation.

The multi-route navigation process 300 need not pre-calculate each and every possible alternate route to the destination location. In this regard, the process 300 could implement a filtering or selection scheme that limits pre-calculation of alternate routes to a manageable, reasonable, and realistic number, and/or that limits pre-calculation of alternate routes to those that result in less impact on the commute. Thus, the process 300 could compare a plurality of potential routes to the proposed route, and select or prioritize the potential routes in a manner that is influenced by the comparison. Such selectivity or priority may be influenced by any appropriate metric that indicates a difference between the originally planned route and an alternate route. In this regard, a difference metric could be a metric such as, without limitation: a distance metric; a travel time metric; a traffic congestion metric; a fuel consumption metric; an energy consumption metric; a vehicle emissions metric; a road condition metric; a sightseeing metric; an undesirable area metric; a services (restaurants, hotels, gas, etc.) metric; a preferred route metric; a metric related to past user behavior at the driver decision point; or any combination thereof. In practice, a potential route might be selected for consideration if its respective difference metric satisfies a threshold criteria. For example, the process may favor alternate routes that add less than a threshold amount of time to the originally planned route and/or alternate routes that add less than a threshold distance to the originally planned route. As another example, the process may disregard alternate routes that might lead the vehicle onto single lane roads.

Although the multi-route navigation process 300 pre-calculates and saves one or more alternate routes, an alternate route need not be activated or executed until needed. In other words, the navigation system can save and update alternate routes until it detects that the vehicle has diverted from its currently designated route. This allows the system to quickly switch to a different route without having to compute the new route on the fly.

The exemplary embodiment described here pre-calculates and updates its alternate routes when the vehicle is near a driver decision point. In certain embodiments, the navigation system pre-calculates one or more alternate routes for the next approaching driver decision point after the vehicle passes the immediately preceding driver decision point. In other words, after the vehicle passes one driver decision point, the navigation system pre-calculates at least one alternate route for the next driver decision point. Accordingly, the illustrated embodiment of the process 300 detects when the vehicle is near, at, or past a driver decision point (query task 310). If so, then the process 300 will also check whether the vehicle has diverted from the proposed route at that driver decision point (query task 312). In practice, query task 312 checks whether the vehicle has performed the predetermined and designated driving maneuver associated with the current driver decision point.

If the process 300 detects that the vehicle has diverted from the proposed route, then the navigation system activates a saved alternate route (task 314). Thereafter, the navigation system continues with the currently activated route (task 316). Moreover, since query task 310 has detected that the vehicle is near, at, or past a driver decision point, the process 300 precalculates at least one updated alternate route (task 318). This updating will be associated with the next approaching driver decision point, resulting in one or more potential alternate routes that might be taken by the vehicle at that next point. After pre-calculating the updated alternate route(s), the process 300 may return to task 308 to save those route(s).

If query task 312 determines that the currently activated route was followed, then the process 300 leads to task 312 and continues as described above. Thus, the current route remains active, and the process 300 proceeds to pre-calculate the next possible alternate routes. The multi-route navigation process 300 may continue in this manner until the vehicle reaches the destination location, and any number of alternate routes may be pre-calculated in a dynamic manner as the vehicle drives to the destination location.

Figure 4:
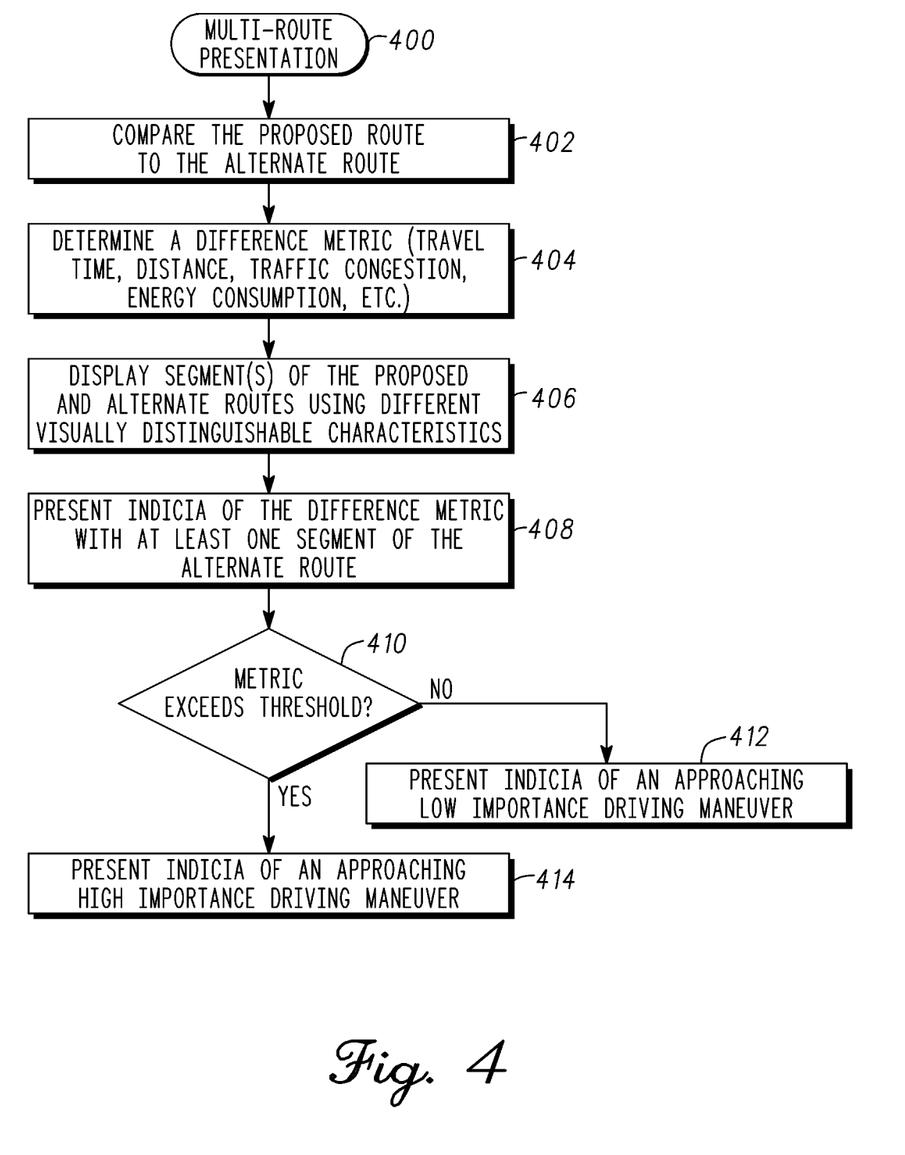
FIG. 4 is a flow chart that illustrates an embodiment of a multi-route presentation process.

The pre-calculation and saving of alternate routes enables the navigation system to present useful information to the driver as the vehicle travels to the destination location. In this regard, FIG. 4 is a flow chart that illustrates an embodiment of a multi-route presentation process 400. The process 400 may be performed by, for example, the navigation system 100. The various tasks performed in connection with the process 400 may be performed by software, hardware, firmware, or any combination thereof. For illustrative purposes, the following description of the process 400 may refer to elements mentioned above in connection with FIG. 1 and FIG. 3. In practice, portions of the process 400 may be performed by different elements of the described system, e.g., the navigation processor, the memory element, the display element, or the like. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. In this regard, the process 400 may be combined with the process 300, or the two processes may be executed in parallel. Moreover, in some embodiments, one or more of the illustrated tasks may be omitted.

The multi-route presentation process 400 assumes that one or more alternate routes (corresponding to the next approaching driver decision point) have been pre-calculated and saved, as explained above. For simplicity and ease of description, this embodiment of the process 400 assumes that one alternate route has been pre-calculated and saved. Accordingly, the process 400 begins by comparing the proposed route to the alternate route (task 402). The resulting route comparison can be used to determine one or more applicable difference metric values (task 404) that indicate some practical difference between the two routes. The difference metric used here may be related to or otherwise associated with any of the following, without limitation: driving distance; travel time; traffic congestion; fuel consumption or economy; energy consumption or economy; vehicle emissions; road condition; sightseeing content; the preference or status of the area; available services (restaurants, hotels, gas, etc.); the preference or status of the route; past user behavior at the driver decision point; or any combination thereof.

In some embodiments, the process 400 displays at least one segment or section of the proposed route in one way, and displays at least one segment or section of the alternate route in a different way, to visually distinguish the proposed route from the alternate route. For example, the proposed route may be rendered using first visually distinguishable characteristics and the alternate route may be rendered using second visually distinguishable characteristics (task 406). In this regard, the different visually distinguishable characteristics may correspond to any of the following characteristics, individually or in any combination thereof: different colors; different brightness; different transparency levels; different translucency levels; different line patterns; different line thickness; different shapes; different sizes; different flicker patterns; different focus levels; different sharpness levels; different clarity levels; different texturing; different shadowing; varying animations that might depict the relative time/speed of the alternate route; or the like.

Figure 5:
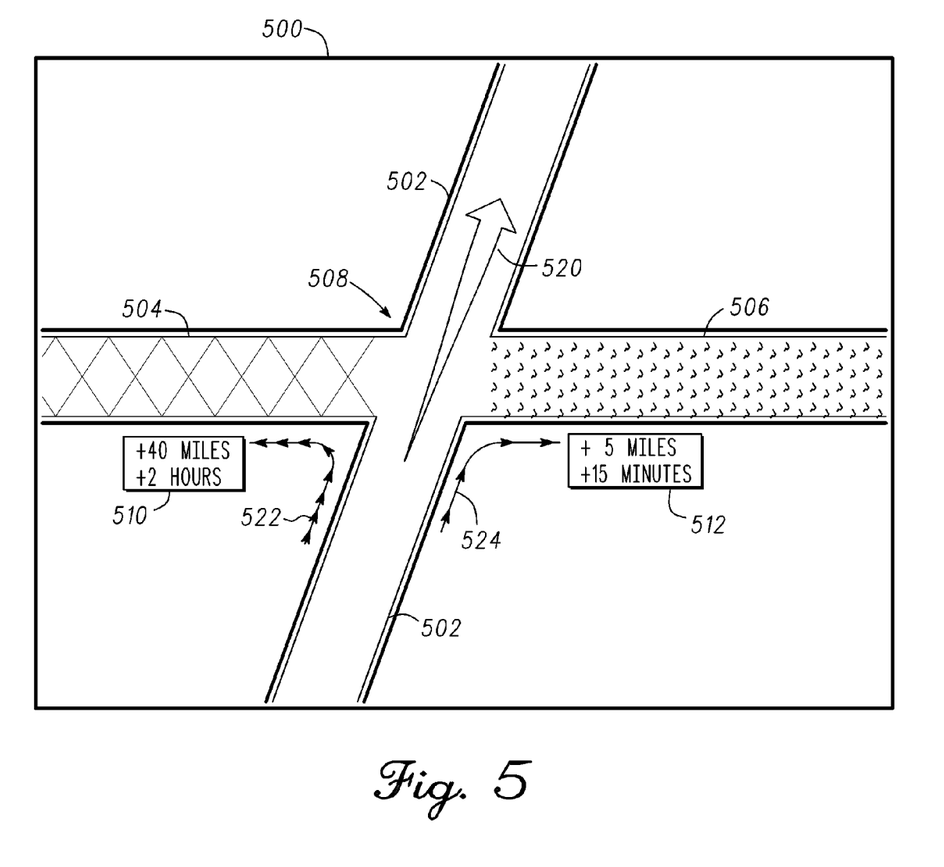
FIG. 5 is a schematic representation of an exemplary display generated by a vehicle navigation system.

The different visually distinguishable characteristics used for rendering route segments may be coded or otherwise selected such that they convey something meaningful and contextually relevant. Moreover, the contextual meaning may be correlated to the difference metric determined during task 404. For example, the proposed route may be rendered in a highlighted manner or by using a specific color such as green, while the alternate route may be rendered in a subdued manner or by using a contrasting color such as amber. In this regard, FIG. 5 is a schematic representation of an exemplary display 500 generated by a vehicle navigation system. The display 500 is a simplified depiction of a segment of a proposed route 502, along with a segment of a first alternate route 504 and a segment of a second alternate route 506. For this example, the proposed route 502 calls for the vehicle to continue straight through an intersection 508. The first alternate route 504 assumes that the vehicle turns left at the intersection 508, and the second alternate route 506 assumes that the vehicle turns right at the intersection 508. FIG. 5 schematically depicts three different visually distinguishable characteristics for the proposed route 502 (e.g., a first color, such as green or white), the first alternate route 504 (e.g., a second color represented by the cross hatching, such as red), and the second alternate route 506 (e.g., a third color represented by the stippling, such as amber). The first alternate route 504 may be displayed in red as an indication that it is not a preferred or desirable route. On the other hand, the second alternate route 506 may be displayed in amber as an indication that it is an appropriate or acceptable route.

Referring again to FIG. 4, the multi-route presentation process 400 may also present (display or announce) to the operator of the vehicle some indicia of the difference metric associated with the alternate route under consideration (task 408). In this regard, different visually distinguishable characteristics (as described above) can be considered to be displayable indicia to the extent they convey meaning that is understandable by the operator. In certain embodiments, however, visible indicia (text, labels, icons, or the like) of the difference metric is displayed along with at least one segment of the alternate route. FIG. 5 depicts one possible implementation that employs text boxes that contain one or more difference metric values for the alternate routes. For example, the first alternate route 504 is displayed with a text box 510 that includes an indication of the estimated additional driving distance (forty miles) and the estimated additional driving time (two hours) that will be experienced if the vehicle is diverted to the first alternate route 504 along the way to the destination location. The second alternate route 506 is displayed with a text box 512 that includes an indication of the estimated additional driving distance (five miles) and the estimated additional driving time (fifteen minutes) that will be experienced if the vehicle is diverted to the second alternate route 506 along the way to the destination location.

In certain embodiments, the calculated difference metric is analyzed and compared to a threshold value (query task 410). The threshold value might correspond to a tolerable or acceptable amount of inconvenience, additional time, additional distance, etc., and the threshold value could be selected or configured by the user. This threshold value is used by the navigation system to determine the relative importance, criticality, desirability, or priority of the upcoming driving maneuver that is associated with the approaching driver decision point. For example, the threshold value may be defined to be a predetermined distance (such as ten miles), a predetermined amount of time (such as thirty minutes), a predetermined measure of fuel consumption (such as a gallon of gasoline), or the like. Moreover, the threshold value may contemplate any appropriate criteria, including a combination of different criteria. For example, the threshold value may contemplate travel time, distance, and/or fuel efficiency. Thus, there could be any number of factors that are considered when determining the relative importance of the upcoming navigation maneuver. The embodiment depicted in FIG. 5 assumes that a lower difference metric value is preferred over a higher difference metric value. In other embodiments, of course, the opposite may hold (depending upon the particular metric used).

For this example, if the computed difference metric value does not exceed the threshold value, then the multi-route presentation process 400 presents indicia of an approaching "low importance" or "optional" or "low priority" driving maneuver (task 412). On the other hand, if the computed difference metric value exceeds the threshold value, then the process 400 presents indicia of an approaching "high importance" or "mandatory" or "high priority" driving maneuver (task 414). In either case, the content of the indicia (whether displayed and/or announced) will be responsive to, or otherwise influenced by, the calculated difference metric value. Although this example relates to an embodiment having two different priority or importance levels, the number of priorities or levels need not be limited to only two. In this regard, a navigation system and the process 400 could be suitably configured to support three (low/intermediate/high) or more priorities.

The navigation system can indicate the importance or criticality of a recommended driving maneuver in any number of ways. For example, the system may render route segments using visually distinguishable characteristics that are coded to indicate the importance of a driving maneuver (see FIG. 5). Thus, if an alternate route segment would add a significant amount of time or distance to the trip, then that alternate route segment may be colored red to indicate that it should be avoided. Alternatively (or additionally), the difference metric value or values themselves may be presented (see FIG. 5) so that the driver can appreciate the actual impact an alternate route might have on the commute. Alternatively (or additionally), graphical icons or symbols could be used to indicate the importance of a given driving maneuver. In FIG. 5, for example, the proposed route 502 is identified using a simple arrow 520. In contrast, the first alternate route 504 is identified using a visibly distinguishable arrow 522 that indicates an undesirable route. The second alternate route 506 is identified using yet another type of arrow 524 that indicate an acceptable route.

The importance, criticality, or nature of an approaching driving maneuver could also be indicated with a different annunciation or display scheme. For example, if the next driver decision point (and its corresponding driving maneuver) has little or no acceptable alternate routes associated therewith, then the process 400 could provide an appropriate warning well in advance, display or announce that the next driving maneuver should be treated as mandatory, and/or present the associated driving instruction in an assertive or authoritative tone. In contrast, if all of the possible alternate routes associated with the next driver decision point are acceptable (e.g., none of them would add significant time or distance to the commute), then the process 400 need not take any special action, it may display or announce that the next driving maneuver can be treated as optional, and/or present the associated driving instruction in a less assertive or less authoritative tone. Moreover, the frequency of announcements and/or the amount of lead time given before the upcoming driver decision point may be influenced by the relative importance of the next driving maneuver. Thus, if the approaching maneuver is considered mandatory, then the driver may be reminded more often and with plenty of lead time. As yet another example, the assertiveness of the navigation system could vary depending upon the relative importance of the maneuver. Thus, important maneuvers could preempt certain system applications/tasks to inform the user of the approaching maneuver, while relatively unimportant maneuvers might have no preemptive impact. Moreover, the navigation system could employ different animated turn indications and/or driving instructions, or employ different voice prompt volume levels in a modulated manner that is influenced by the relative importance of the approaching maneuver.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer implemented navigation method for instructing an operator of a vehicle, the method comprising:
   obtaining, at a computer system having a processor, a destination location;
   generating, with the processor, a proposed route to the destination location, the proposed route defined by one or more driver decision points and associated driving maneuvers; and
   before the vehicle reaches an approaching driver decision point of the driver decision points, pre-calculating an alternate route between the approaching driver decision point and the destination location, wherein the alternate route is different than the proposed route;
   determining a relative importance indicator for the alternate route, by:
       calculating whether a first approaching maneuver of the alternate route, at the approaching driver decision point, is optional;
       calculating whether the first approaching maneuver of the alternate route, at the approaching driver decision point, is highly recommended;

calculating whether the first approaching maneuver of the alternate route, at the approaching driver decision point, is mandatory; and generating the relative importance indicator based upon the calculating steps, wherein the relative importance indicator conveys a condition of importance for the approaching driver decision point of the alternate route, and wherein the relative importance indicator is configured for communication to a user;

wherein the relative importance indicator comprises:
- a first frequency of announcements of the first approaching maneuver when the first approaching maneuver is optional;
- a second frequency of announcements of the first approaching maneuver when the first approaching maneuver is highly recommended; and
- a third frequency of announcements of the first approaching maneuver when the first approaching maneuver is mandatory;
- wherein the first frequency comprises a low frequency, the third frequency comprises a high frequency, and the second frequency comprises a frequency between the low frequency and the high frequency;

communicating the relative importance indicator to the operator of the vehicle; and saving the alternate route within computer memory to obtain a saved alternate route for subsequent activation.

2. The method of claim 1, further comprising detecting when the vehicle is near a current driver decision point of the driver decision points of the proposed route, wherein the current driver decision point is different than the approaching driver decision point, and wherein pre-calculating the alternate route is triggered in response to the detecting step.

3. The method of claim 2, wherein the current driver decision point immediately precedes the approaching driver decision point in the proposed route.

4. The method of claim 1, further comprising:
detecting when the vehicle has diverted from the proposed route at the approaching driver decision point; and
activating the saved alternate route in response to the detecting step, resulting in an activated alternate route.

5. The method of claim 4, further comprising:
pre-calculating an updated alternate route between a next approaching driver decision point of the activated alternate route and the destination location, wherein the updated alternate route is different than the activated alternate route; and
saving the updated alternate route to obtain a saved updated alternate route for subsequent activation.

6. The method of claim 1, further comprising:
displaying at least one segment of the proposed route using first visually distinguishable characteristics; and
displaying at least one segment of the alternate route using second visually distinguishable characteristics that are different than the first visually distinguishable characteristics.

7. The method of claim 1, further comprising:
comparing the proposed route to the alternate route to obtain a route comparison;
determining a difference metric value associated with the route comparison; and
displaying at least one segment of the alternate route, along with indicia of the difference metric value.

8. The method of claim 7, wherein the difference metric value comprises a metric selected from the group consisting of: a distance metric; a travel time metric; a traffic congestion metric; a fuel consumption metric; an energy consumption metric; a vehicle emissions metric; a road condition metric; a sightseeing metric; an undesirable area metric; a services metric; a preferred route metric; and a metric related to past user behavior at the driver decision point.

9. The method of claim 1, further comprising:
pre-calculating a plurality of potential routes between the approaching driver decision point and the destination location, the potential routes including the alternate route, and each of the potential routes being different than the proposed route;
comparing each of the potential routes to the proposed route; and
determining, in response to the comparing step, a respective difference metric value for each of the potential routes; wherein
the difference metric value for the alternate route satisfies a threshold criteria.

10. The method of claim 9, wherein the difference metric value comprises a metric selected from the group consisting of: a distance metric; a travel time metric; a traffic congestion metric; a fuel consumption metric; an energy consumption metric; a vehicle emissions metric; a road condition metric; a sightseeing metric; an undesirable area metric; a services metric; a preferred route metric; and a metric related to past user behavior at the driver decision point.

11. A computer-implemented navigation method for instructing an operator of a vehicle, the method comprising:
generating, at a computer system having a processor, a proposed route to a destination location;
pre-calculating, with the processor, before the vehicle reaches an approaching driver decision point of the proposed route, an alternate route between the approaching driver decision point and the destination location, wherein the alternate route is different than the proposed route;
comparing the proposed route to the alternate route to obtain a route comparison;
determining a difference metric value associated with the route comparison;
utilizing the difference metric value to:
- calculate whether a first approaching maneuver of the alternate route, at the approaching driver decision point, is optional;
- calculate whether the first approaching maneuver of the alternate route, at the approaching driver decision point, is highly recommended;
- calculate whether the first approaching maneuver of the alternate route, at the approaching driver decision point, is mandatory; and
- generate indicia of the importance of a driving maneuver associated with the approaching driver decision point based upon the calculating steps;
wherein the relative importance indicator comprises:
- a first volume of announcements of the first approaching maneuver when the first approaching maneuver is optional;
- a second volume of announcements of the first approaching maneuver when the first approaching maneuver is highly recommended; and
- a third volume of announcements of the first approaching maneuver when the first approaching maneuver is mandatory;
- wherein the first volume comprises a low volume, the third volume comprises a high volume, and the second volume comprises a volume level between the low volume and the high volume; and presenting, to the operator of the vehicle the indicia of the importance of a driving maneuver associated with the approaching driver decision point, wherein the driving maneuver is recommended by the proposed route.

12. The method of claim 11, further comprising:
detecting when the vehicle has not performed the driving maneuver; and
activating the alternate route in response to the detecting step, resulting in an activated alternate route.

13. The method of claim 11, further comprising:
displaying at least one segment of the proposed route using first visually distinguishable characteristics; and
displaying at least one segment of the alternate route using second visually distinguishable characteristics that are different than the first visually distinguishable characteristics.

14. The method of claim 11, wherein the difference metric value comprises a metric selected from the group consisting of: a distance metric; a travel time metric; a traffic congestion metric; a fuel consumption metric; an energy consumption metric; a vehicle emissions metric; a road condition metric; a sightseeing metric; an undesirable area metric; a services metric; a preferred route metric; and a metric related to past user behavior at the driver decision point.

15. The method of claim 11, further comprising comparing the difference metric value to a threshold value, wherein the presenting step comprises:
presenting indicia of a low importance driving maneuver when the difference metric value is less than the threshold value; and
presenting indicia of a high importance driving maneuver when the difference metric value is greater than the threshold value.

16. The method of claim 15, wherein:
the difference metric value represents additional driving distance to the destination location, the additional driving distance being associated with the alternate route; and
the threshold value is a predetermined distance.

17. The method of claim 15, wherein:
the difference metric value represents additional driving time to the destination location, the additional driving time being associated with the alternate route; and
the threshold value is a predetermined amount of time.

18. A navigation system for instructing an operator of a vehicle, the system comprising:
a navigation processor configured to obtain a destination location, and to generate a proposed route to the destination location, the proposed route defined by one or more driver decision points and associated driving maneuvers; and
a display element coupled to the navigation processor, the display element configured to render a graphical representation of at least one segment of the proposed route;
wherein:
before the vehicle reaches an approaching driver decision point of the driver decision points, the navigation processor:
pre-calculates an alternate route between the approaching driver decision point and the destination location;
determines a relative importance indicator for the alternate route, by:
calculating whether a first approaching maneuver of the alternate route, at the approaching driver decision point, is optional;
calculating whether the first approaching maneuver of the alternate route, at the approaching driver decision point, is highly recommended;
calculating whether the first approaching maneuver of the alternate route, at the approaching driver decision point, is mandatory; and
generating the relative importance indicator based upon the calculating steps, wherein the relative importance indicator conveys a condition of importance for the first approaching maneuver of the alternate route, and wherein the relative importance indicator is configured for communication to a user;
wherein the relative importance indicator comprises:
a first tone of announcements of the first approaching maneuver when the first approaching maneuver is optional;
a second tone of announcements of the first approaching maneuver when the first approaching maneuver is highly recommended; and
a third tone of announcements of the first approaching maneuver when the first approaching maneuver is mandatory;
wherein the first tone comprises a low degree of authoritative tone, the third tone comprises a high degree of authoritative tone, and the second frequency comprises a degree of authoritative tone between the low degree and the high degree;
communicates the relative importance indicator to the operator of the vehicle; and
activates the alternate route when the vehicle diverts from the proposed route at the approaching driver decision point.

19. The system of claim 18, wherein:
the navigation processor compares the proposed route to the alternate route to obtain a route comparison;
the navigation processor determines a difference metric value associated with the route comparison; and
the display element displays at least one segment of the at least one alternate route, along with indicia of the difference metric value.

20. The system of claim 18, wherein:
the navigation processor compares the proposed route to the alternate route to obtain a route comparison;
the navigation processor determines a difference metric value associated with the route comparison; and
the display element displays indicia of the importance of a proposed driving maneuver associated with the approaching driver decision point, wherein the proposed driving maneuver is included in the proposed route, and wherein content of the indicia is influenced by the difference metric value.

* * * * *